United States Patent
Chen et al.

(10) Patent No.: US 10,649,485 B2
(45) Date of Patent: May 12, 2020

(54) SYNCHRONIZING TIMING SOURCES IN COMPUTING DEVICES

(71) Applicant: Microsoft Technology Licensing, LLC, Redmond, WA (US)

(72) Inventors: Anthony Yuting Chen, Bellevue, WA (US); Vivek Gupta, Bothell, WA (US); Randall Edward Aull, Bothell, WA (US); Benjamin Allen Pullen, Redmond, WA (US); Kiran Kudli Anantha Shastry, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 151 days.

(21) Appl. No.: 15/856,312

(22) Filed: Dec. 28, 2017

(65) Prior Publication Data

US 2019/0101953 A1 Apr. 4, 2019

Related U.S. Application Data

(60) Provisional application No. 62/565,785, filed on Sep. 29, 2017.

(51) Int. Cl.
| | |
|---|---|
| *G06F 1/12* | (2006.01) |
| *G06F 13/42* | (2006.01) |
| *H04L 5/00* | (2006.01) |
| *H04L 7/00* | (2006.01) |
| *G06F 1/14* | (2006.01) |

(52) U.S. Cl.
CPC . *G06F 1/12* (2013.01); *G06F 1/14* (2013.01)

(58) Field of Classification Search
CPC ..................................... G06F 1/12; G06F 1/14
See application file for complete search history.

(56) References Cited

U.S. PATENT DOCUMENTS

| | | |
|---|---|---|
| 2013/0013811 A1 | 1/2013 | Liu et al. |
| 2015/0127284 A1 | 5/2015 | Seshan et al. |

FOREIGN PATENT DOCUMENTS

| | | |
|---|---|---|
| EP | 1053619 A1 | 11/2000 |
| EP | 2608444 A1 | 6/2013 |

OTHER PUBLICATIONS

"International Search Report and Written Opinion Issued in PCT Application No. PCT/US2018/039648", dated Oct. 10, 2018, 13 Pages.
"_URB_GET_CURRENT_FRAME_NUMBER structure", Retrieved From <<https://msdn.microsoft.com/en-us/library/windows/hardware/ff540401(v=vs.85).aspx>>, Retrieved on: Jun. 26, 2017, 2 Pages.
"USBD_QueryUsbCapability routine", Retrieved From <<https://msdn.microsoft.com/en-us/library/windows/hardware/hh406230(v=vs.85).aspx>>, Retrieved on: Jun. 26, 2017, 1 Page.

*Primary Examiner* — Xuxing Chen
(74) *Attorney, Agent, or Firm* — Arent Fox LLP

(57) ABSTRACT

Described are examples for synchronizing multiple timing sources in a computing device. At least a first clock associated with a first timing source and a second clock associated with a second timing source can be maintained at the computing device. A request for an indication of a difference in values between the first clock and the second clock can be received from the application. A first elapsed time of the first clock and a second elapsed time of the second clock from a previous instance of an event can be determined by the computing device at an instance of a reoccurring event in a domain of one of the first timing source or the second timing source. An indication related to the first elapsed time and the second elapsed time can be provided to the application.

19 Claims, 4 Drawing Sheets

SYNCHRONIZING TIMING SOURCES IN COMPUTING DEVICES

CLAIM OF PRIORITY UNDER 35 U.S.C. § 119

The present Application for Patent claims priority to Provisional Application No. 62/565,785, entitled "SYNCHRONIZING TIMING SOURCES IN COMPUTING DEVICES" filed Sep. 29, 2017, which is assigned to the assignee hereof and hereby expressly incorporated by reference herein for all purposes.

BACKGROUND

Many computing devices employ input devices, such as sensors (e.g., inertial sensors, camera sensors, etc.) that produce output streams for consumption by applications operating on the computing device. The sensors can include or otherwise utilize a timing source to operate a clock for providing timing information of captured data. The timing sources among the input devices and/or the computing device (e.g., of a central processing unit (CPU) or other processor in the computing device), however, may not be the same, and thus may not always be synchronized and/or may experience drift from one another as time goes on. For certain types of devices and/or associated applications, high synchronization between peripheral devices and/or the CPU may be desirable to attain a certain level of user experience, such as in virtual reality, mixed reality, autonomous driving, or similar applications.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

In an example, a method for synchronizing multiple timing sources in a computing device is provided. The method includes maintaining, by the computing device, at least a first clock associated with a first timing source and a second clock associated with a second timing source, receiving, from an application, a request for an indication of a difference in values between the first clock and the second clock, determining, by the computing device and at an instance of a reoccurring event in a domain of one of the first timing source or the second timing source, a first elapsed time of the first clock and a second elapsed time of the second clock from a previous instance of an event, and providing, to the application, an indication related to the first elapsed time and the second elapsed time.

In another example, a device for synchronizing multiple timing sources is provided. The device includes a memory storing one or more parameters or instructions for maintaining multiple timing sources, and at least one processor coupled to the memory. The at least one processor is configured to maintain at least a first clock associated with a first timing source and a second clock associated with a second timing source, receive, from an application, a request for an indication of a difference in values between the first clock and the second clock, determine, at an instance of a reoccurring event in a domain of one of the first timing source or the second timing source, a first elapsed time of the first clock and a second elapsed time of the second clock from a previous instance of an event, and provide, to the application, an indication related to the first elapsed time and the second elapsed time.

In another example, a computer-readable medium including code executable by one or more processors for synchronizing multiple timing sources in a computing device is provided. The code includes code for maintaining, by the computing device, at least a first clock associated with a first timing source and a second clock associated with a second timing source, receiving, from an application, a request for an indication of a difference in values between the first clock and the second clock, determining, by the computing device and at an instance of a reoccurring event in a domain of one of the first timing source or the second timing source, a first elapsed time of the first clock and a second elapsed time of the second clock from a previous instance of an event, and providing, to the application, an indication related to the first elapsed time and the second elapsed time.

To the accomplishment of the foregoing and related ends, the one or more implementations comprise the features hereinafter fully described and particularly pointed out in the claims. The following description and the annexed drawings set forth in detail certain illustrative features of the one or more implementations. These features are indicative, however, of but a few of the various ways in which the principles of various implementations may be employed, and this description is intended to include all such implementations and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to synchronizing timing among multiple timing sources in a computing device, which can facilitate association of data obtained from multiple sources though the data may be timestamped (or otherwise associated with a time) based on different timing sources. For example, where a computing device operates multiple timing sources, a first clock value of a first timing source can be determined respective to, or as otherwise compared with, a second clock value of a second timing source. In an example, the first clock value and second clock value can correspond to elapsed time values for the first and second timing sources between known events, such as between instances of a reoccurring event, between initialization and an instance of an event, etc. The difference between the elapsed time values can provide an indication of clock drift among the timing sources (e.g., as measured from the known event(s)). An indication of the clock drift or other difference between the first clock value and the second clock value can be provided to one or more applications to allow the applications to synchronize timing among the timing sources.

In a specific example, an application may receive data from an input device having an associated timestamp that uses a timing source associated with the input device. For example, this timing source may be a timing source of the input device itself, a timing source of a corresponding interface controller that interfaces the input device with the computing device, etc. The application may request the synchronization information from an operating system, which may include a clock value of a current frame of the timing source associated with the interface controller, and a host clock value of the computing device (e.g., of a central processing unit (CPU) or other processor of the computing device) at the current frame of the interface controller. The application can use the clock value and the host clock value to determine a host clock value associated with the timestamp of the data from the input device. In another example, the synchronization information can include clock drift information, which the application can further apply to determine a more accurate host clock value associated with the timestamp of the data from the input device where clock drift is occurring.

Figure 1:
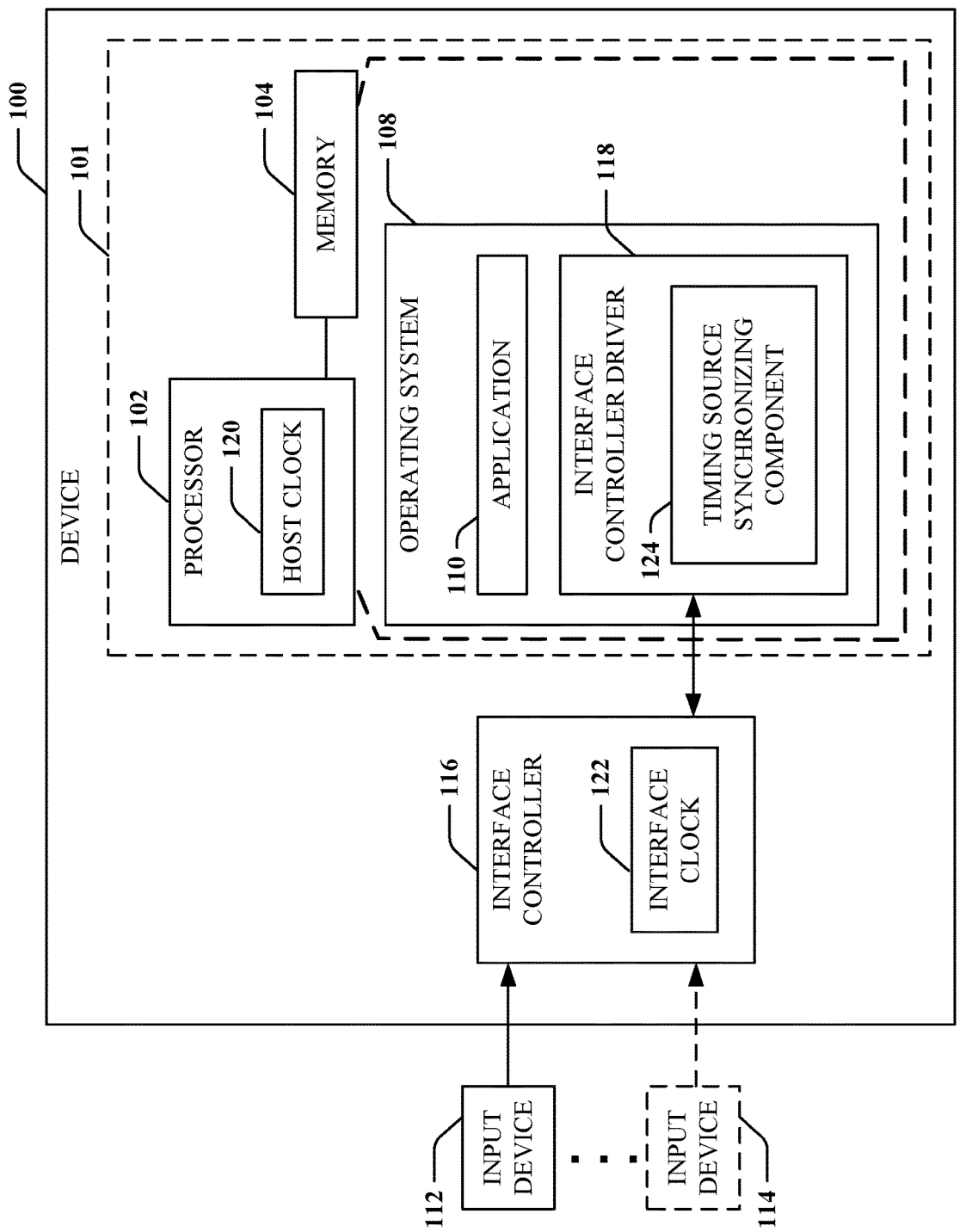
FIG. 1 is a schematic diagram of an example of a device for synchronizing timing among multiple timing sources in accordance with examples described herein.
Figure 2:
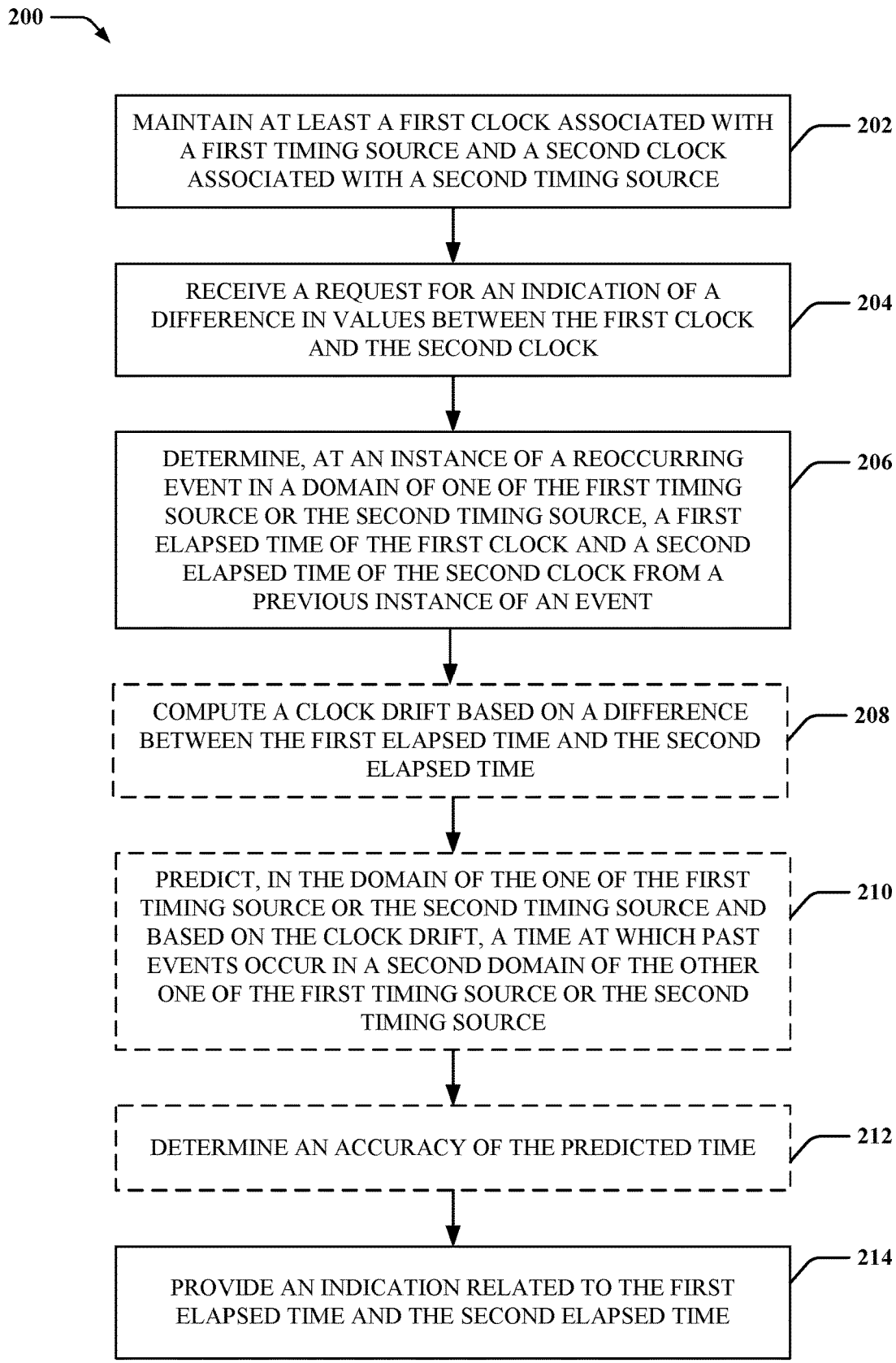
FIG. 2 is a flow diagram of an example of a method for synchronizing timing among multiple timing sources in accordance with examples described herein.
Figure 3:
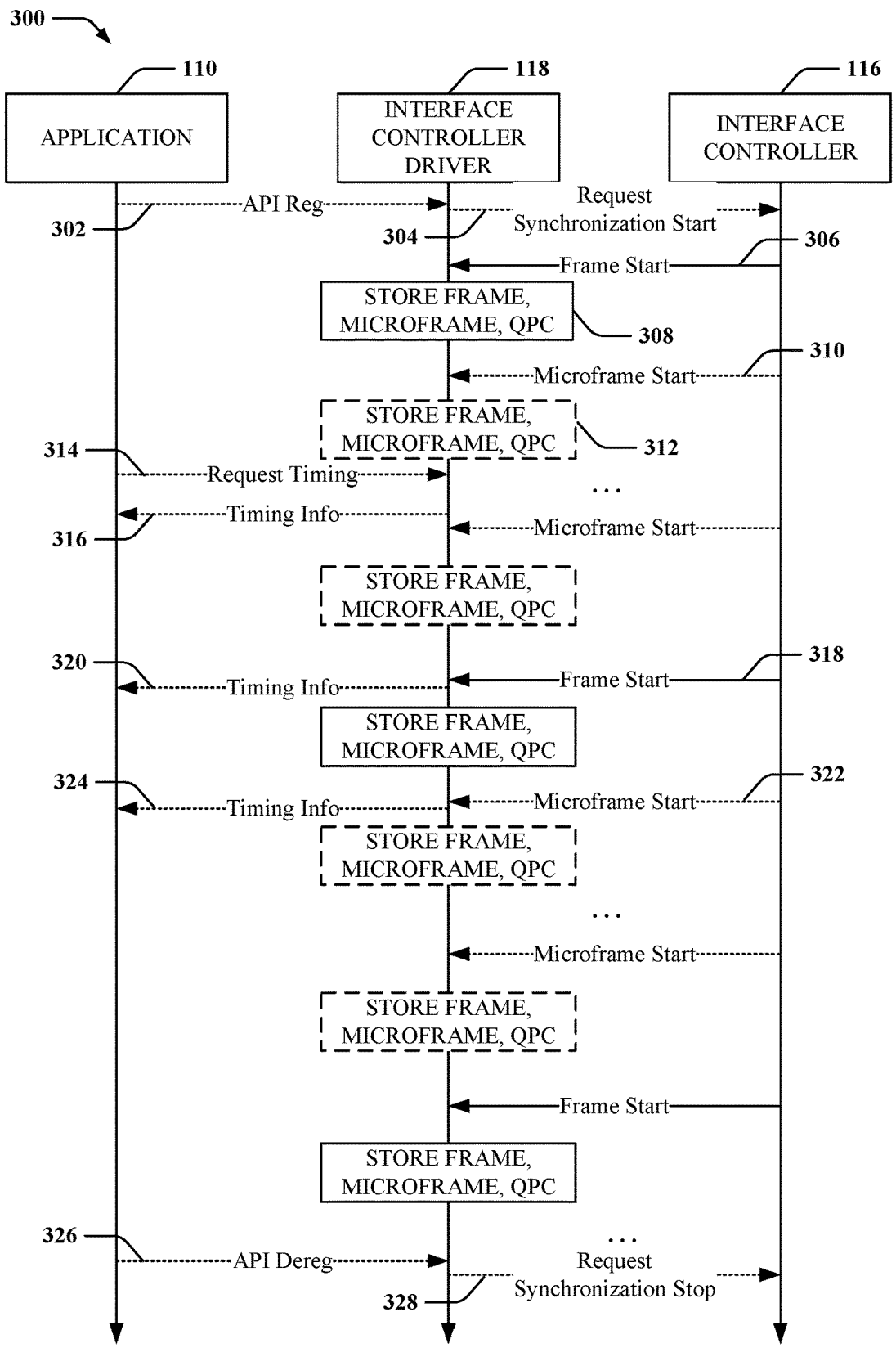
FIG. 3 is an example of a message flow diagram for synchronizing timing among multiple timing sources and providing timing information in accordance with examples described herein.

Turning now to FIGS. 1-3, examples are depicted with reference to one or more components and one or more methods that may perform the actions or operations described herein, where components and/or actions/operations in dashed line may be optional. Although the operations described below in FIG. 2 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a device 100 (e.g., a computing device) that can synchronize timing among multiple timing sources. In an example, device 100 can include a processor 102 and/or memory 104 configured to execute or store instructions or other parameters related to providing an operating system 108, which can provide an environment for executing one or more applications 110, etc. For example, processor 102 and memory 104 may be separate components communicatively coupled by a bus (e.g., on a motherboard or other portion of a computing device, on an integrated circuit, such as a system on a chip (SoC), etc.), components integrated within one another (e.g., processor 102 can include the memory 104 as an on-board component 101), and/or the like. Memory 104 may store instructions, parameters, data structures, etc., for use/execution by processor 102 to perform functions described herein.

Device 100 can also include one or more input devices 112, 114 that can be integrated within device 100, attached as a peripheral to the device 100 (e.g., via one or more wired or wireless interface (e.g., universal serial bus (USB), Firewire, local area network (LAN), wireless LAN (WLAN), Bluetooth, radio frequency identification (RFID), near field communication (NFC), etc.), and/or the like. For example, the one or more input devices 112, 114 may include one or more sensor devices, which may include an inertial sensor (e.g., an accelerometer, gyroscope, etc.), an image sensor (e.g., a red, green, blue (RGB) camera, infrared (IR) camera, depth camera, etc.), which may be video cameras, still image cameras, etc., an eye scan or eye tracking sensor, a fingerprint or touch sensor, a microphone, etc., for receiving and/or processing input data intended for the device 100.

In an example, device 100 can provide an interface controller 116 over which input devices 112, 114 can communicate with other components of the device 100, such as operating system 108, applications 110, etc. to provide data received from the input device. For example, operating system 108 can provide an interface controller driver 118, which can be a user mode driver, to facilitate communication between the interface controller 116 and the operating system 108 to receive and/or transmit data from/to the input devices 112, 114. In an example, the interface controller 116 can be a USB controller configured to communicate with one or more input devices 112, 114 via a USB interface. The USB controller can receive data from the input devices 112, 114 in a format for communicating over USB, and can provide corresponding data to the interface controller driver 118. Operating system 108, and/or application 110, can access the data from the input devices 112, 114 via the interface controller driver 118 communicating with interface controller 116. In other examples, interface controller 116 may include a Firewire, LAN, WLAN, Bluetooth, RFID, NFC, or substantially any controller configured for communicating via a wired or wireless interface, and may have a corresponding interface controller driver 118.

For example, processor 102 (or another component of the device 100) can maintain a timing source in the form of a host clock 120, which can provide a clock used in executing instructions on the processor 102 (e.g., a CPU clock). For example, the host clock 120 can track time using a first granularity (e.g., a number of hertz (Hz)). In addition, in an example, the operating system 108 may access the host clock 120, and can provide an interface to host clock 120 values via a query performance counter (QPC) function. The interface controller 116, in an example, can also maintain a timing source in the form of an interface clock 122 for timestamping data received from the input devices 112, 114. The interface clock 122 may track time using a second granularity (e.g., a number of Hz), which may be different than the first granularity. In one example, the host clock 120 and interface clock 122 may operate using a similar bus speed in theory, but the clocks 120, 122 may actually drift (e.g., at different rates) over time due to a variety of factors. For example, the interface clock 122 may be implemented in different hardware than the host clock 120, and each clock 120, 122 or related hardware may have properties that result in the clocks 120, 122 tracking time differently. In one example, silicon used to provide the processor 102 and/or interface controller 116 may be different, which may cause the clocks 120, 122 to drift. In another example, operating or ambient temperature may be different, which may cause the clocks to drift. Moreover, the clocks 120, 122 may not initialize to the same initial time value. Accordingly, the host clock 120 and interface clock 122 may not be synchronized, and thus their clock values at any given time may differ and/or differ at different rates (drift) as time goes by.

Accordingly, interface controller driver 118 (and/or another component of the operating system 108) may include a timing source synchronizing component 124 for applying a synchronization to clock values of different timing sources, such to allow the operating system 108 and/or one or more applications 110 to resolve the clock values of the timing sources with respect to one another. For example, in applying the synchronization, the timing source synchronizing component 124 can provide clock values of the host clock 120, interface clock 122 (and/or other clocks) at a particular instant in time, which may correspond to a reoccurring event in the domain of the host clock 120 or interface clock 122. In another example, the timing source synchronizing component 124 can additionally or alternatively provide other information regarding the timing difference between host clock 120 and interface clock 122, such as a difference value at the instant in time, a clock drift measured at the instant in time with respect to a previous instant in time (e.g., a time of a previous instance of the reoccurring event, a time at initialization of the host clock 120 and/or the interface clock 122, etc.), a prediction of accuracy of the reported clock drift, and/or the like. Operating system 108 and/or one or more applications 110 can use this information to resolve a clock value of interface clock 122 in the domain of host clock 120, and/or vice versa (and/or resolve other clock values of one domain in another domain). This can enable the operating system 108 and/or one or more applications 110 to correlate data received from multiple input devices via the interface controller 116 (and/or via one or more other interface controllers, not shown) and/or data associated with the operating system 108 and/or application(s) 110, etc.

FIG. 2 is a flowchart of an example of a method 200 for synchronizing multiple timing sources in a computing device. For example, method 200 can be performed by a device 100 and/or one or more components thereof to facilitate synchronizing timing values received from a host clock 120, interface clock 122, and/or other clocks.

In method 200, at action 202, at least a first clock associated with a first timing source and a second clock associated with a second timing source can be maintained. In an example, device 100, e.g., in conjunction with processor 102, memory 104, interface controller 116, etc., can maintain at least the first clock associated with the first timing source (e.g., host clock 120 associated with processor 102) and the second clock associated with the second timing source (e.g., interface clock 122 associated with interface controller 116). In an example, as described, the clocks 120, 122 may be implemented in processor 102 and/or interface controller 116 hardware, which may be connected via a bus on the device 100 to facilitate communication therebetween and/or with other components of the device 100. Maintaining the clocks 120, 122, in this regard, may include the corresponding hardware (e.g., processor 102, interface controller 116, etc.) initializing and/or operating the clocks to track time at corresponding granularities and/or based on corresponding clock speeds (e.g., a number of Hz).

In an example, as described, processor 102 may maintain host clock 120 as a CPU clock based on a number of pulses per second that can be measured in Hz. In addition, for example, interface controller 116 may maintain interface clock 122 as a USB clock for tracking a number of USB frames, occurring every 1 millisecond (ms), and a number of USB microframes within each USB frame, which occur every 125 microseconds (us). The host clock 120 and interface clock 122 may not always be synchronized based on being provided by different hardware, at environments with different ambient temperatures within the device 100, etc. Based on this and/or based on the fact that the clocks 120, 122 operate using different granularities, the device 100 may benefit from a synchronization of the clocks 120, 122 using a provided indication for matching values of one clock with values of the other at one or more instants in time. Mechanisms for achieving such synchronization are described herein.

In method 200, at action 204, a request for an indication of a difference in values between the first clock and the second clock can be received. In an example, interface controller driver 118, e.g., in conjunction with processor 102, memory 104, operating system 108, etc., can receive the request (e.g., from an application 110) for the indication of the difference in values between the first clock (e.g., host clock 120) and the second clock (e.g., interface clock 122). In one example, the application 110 can issue the request to the timing source synchronizing component 124 based on the application 110 initializing a module for receiving data from the one or more input devices 112, 114 via interface controller 116. In another example, the application 110 can issue the request based at least in part on comparing a processing load to a threshold or an operating/ambient temperature to a threshold to ensure additional processing performed by the timing source synchronizing component 124 does not cause undesirable load on the processor 102. Moreover, for example, the request can correspond to a request for a single indication of the difference, which can be measured as a number of ms, us, etc. In another example, the request may correspond to a request to receive multiple indications of the difference (e.g., occurring based on one or more detectable events, such as a clock overflow, as described further herein).

In method 200, at action 206, a first elapsed time of the first clock and a second elapsed time of the second clock from a previous instance of an event can be determined at an instance of a reoccurring event in a domain of one of the first timing source or the second timing source. In an example, timing source synchronizing component 124, e.g., in conjunction with processor 102, memory 104, operating system 108, etc., can determine, at the instance of the reoccurring event in the domain of the one of the first timing source (e.g., processor 102) or the second timing source (e.g. interface controller 116), the first elapsed time of the first clock and the second elapsed time of the second clock from the previous instance of the event. For example, the previous instance of the event may correspond to initialization of the host clock 120 and/or interface clock 122, a previous instance of the reoccurring event, and/or the like. In addition, in an example, the reoccurring event may correspond to a clock overflow of the host clock 120 and/or interface clock 122.

In a specific example, the interface controller 116 may be a USB controller, and the interface clock 122 may accordingly report time to the operating system 108 through a register (MFINDEX) with 14 bits for the elapsed USB micro frames, where 11 bits are used for elapsed 1 ms frames and 3 bits are used for elapsed 125 us microframes within the given 1 ms frame. Accordingly, the interface clock 122 for USB can report clock values up to 2048 ms at a granularity of 125 us. In this example, the reoccurring event can correspond to an interrupt received when the MFINDEX register overflows (e.g., and resets the interface clock 122, which can occur every 2048 ms in the interface clock 122 domain). In this example, the timing source synchronizing component 124 can continuously determine an elapsed time of the host clock 120 every 2048 ms in the interface clock 122 domain, based on occurrence of the MFINDEX register overflow, to determine the clock drift between the host clock 120 and the interface clock 122. For example, where timing source synchronizing component 124 determines that the host clock 120 elapses 2200 ms between instances of the reoccurring event (e.g., when the interface clock 122 elapses 2048 ms), the timing source synchronizing component 124 can determine that the interface clock 122 is around 2200/2048=7.42% faster than the host clock 120. Accordingly, after the start of a new frame, the timing source synchronizing component 124 can expect the next microframe to occur at 125 us*107.42%=134.27 us, the second microframe to start at 268.55 us, the third microframe to start at 402.83 us, etc., in the host clock 120 domain. In an example, timing source synchronizing component 124 can provide the difference in values of the clocks 120, 122, a computed clock drift (e.g., as a percentage and/or as applied to one of the clock values), etc.

In method 200, optionally at action 208, a clock drift can be computed based on a difference between the first elapsed time and the second elapsed time. In an example, timing source synchronizing component 124, e.g., in conjunction with processor 102, memory 104, operating system 108, etc., can compute the clock drift between the first elapsed time and the second elapsed time. As described above, for example, the timing source synchronizing component 124 can determine the first elapsed time of the first clock (e.g., host clock 120) between two instants in time and the second elapsed time of the second clock (e.g., interface clock 122) between the instants in time, and can determine clock drift based on the difference between the elapsed times (e.g., as measured in ms, us, etc.). In addition, for example, timing source synchronizing component 124 can determine this clock drift at each instance of the reoccurring event, as described. Moreover, for example, timing source synchronizing component 124 can report the clock drift to operating system 108 (or one or more components thereof), one or more applications 110, etc. periodically and/or based on request.

In method 200, optionally at action 210, a time at which the past events occur in a second domain of the other one of the first timing source or the second timing source can be predicted, in the domain of the one of the first timing source or the second timing source and based on the clock drift, to determine an accuracy of the computed clock drift. In an example, timing source synchronizing component 124, e.g., in conjunction with processor 102, memory 104, operating system 108, etc., can predict, in the domain of the one of the first timing source or the second timing source and based on the clock drift (e.g., the clock drift determined by the timing source synchronizing component 124, as described above), the time at which the past events occur in the second domain of the other one of the first timing source or the second timing source to determine an accuracy of the computed clock drift. For example, timing source synchronizing component 124 can apply the clock drift, determined in the domain of the host clock 120, to a time of a past event occurring in the domain of the interface clock 122, and can compare the result to the actual time of the event in the domain of the interface clock 122 to determine the accuracy. For example, timing source synchronizing component 124 can determine the accuracy as a computed value of predicted time and the actual time (e.g., a ratio of predicted time to actual time, and/or the like). This can allow the timing source synchronizing component 124 to indicate the accuracy when providing an indication of clock values, clock drift, etc., as described herein.

In method 200, optionally at action 212, an accuracy of the predicted time can be determined. In an example, timing source synchronizing component 124, e.g., in conjunction with processor 102, memory 104, operating system 108, etc., can determine the accuracy of the predicted time. For example, timing source synchronizing component 124 can determine the accuracy of the predicted time based on an accuracy of one of the first timing source or the second timing source. Thus, for example, in the case of a USB timing source, the accuracy may correspond to the granularity of the USB clock (e.g., 125 us). In an example, however, the request received at action 204 may indicate an option for an edge detection, in which case determining the first elapsed time of the first clock and second elapsed time of the second clock can occur at an instance of an edge of one of the clocks (e.g., where the edge can be a round division of time, such as a frame or microframe, an instance of a beginning of a microsecond, etc.). For example, where interface clock 122 is for USB, timing source synchronizing component 124 can determine the first elapsed time and second elapsed time at an edge of the interface clock 122 (e.g., at a beginning of a USB frame of 1 ms or a beginning of a USB microframe at 125 us). In this example, timing source synchronizing component 124 can determine (and indicate, e.g., as part of the indication in action 214 below) an accuracy corresponding to the granularity of the host clock 120 (e.g., on the order of tens or hundreds of nanoseconds for a QPC).

In method 200, at action 214, an indication related to the first elapsed time and the second elapsed time can be provided. In an example, timing source synchronizing component 124, e.g., in conjunction with processor 102, memory 104, operating system 108, etc., can provide the indication related to the first elapsed time and the second elapsed time. For example, timing source synchronizing component 124 can provide the indication to the application 110, which can have requested the indication (e.g., at action 204). In addition, timing source synchronizing component 124 can provide the indication in response to the request, periodically based on one or more triggers, such as the reoccurring event, etc. Moreover, timing source synchronizing component 124 may include, in the indication, one or more clock values from the first clock and/or second clock, the first elapsed time and second elapsed time, a difference between the first elapsed time and the second elapsed time, a computed clock drift (e.g., as a percentage, a number of microseconds or other measure of time, etc.), a predicted accuracy of the computed clock drift, etc., as described above. In addition, timing source synchronizing component 124 can enable or disable tracking and/or determining clock drift based on a variety of factors, such as power utilization, ambient or operational temperature, etc.

In one example, timing source synchronizing component 124 can autonomously (and/or based on an initial request) manage synchronizing of the clocks 120, 122, and determining of the first and/or second elapsed time, clock drift, accuracy, etc. based on the reoccurring event over a period of time. In this example, timing source synchronizing component 124 may provide the current indication of the first and/or second elapsed time, clock drift, accuracy, etc. upon request.

The examples described above can allow for sufficiently accurate and power-efficient synchronization between the time derived from the processor 102 clock and the interface clock 122 (e.g., USB bus time derived from the USB controller clock). For example, the application 110 can query an application programming interface (API) that can be exposed by the interface controller driver 118 (e.g., the USB driver stack in the operating system 108) that maps to the QPC values, which can be tracked by the operating system 108 and can correspond to a timing of the host clock 120, to the interface (e.g., USB) frame and microframes tracked by the interface controller 116 (e.g., USB host controller hardware). This can allow the application 110 to synchronize its own functions, which can operate on the processor 102 and thus correspond to the timing of the host clock 120, with the data provided by the devices on the interface controller 116 (e.g., USB bus), which can correspond to the timing of the interface clock 122. For example, the API exposed by the interface controller driver 118 can allow application 110 to get the current interface (e.g., USB) frame and microframe, as well as the QPC value associated with the frame and microframe. As described, for example, the interface controller driver 118 can determine the QPC value associated with a current frame and microframe, a QPC value associated with a previous frame and microframe, etc., and can provide the information to the application 110 upon request. In addition, for example, the API can allow the application 110 to get the QPC value that occurred at the beginning of a specified interface (e.g., USB) frame and microframe (e.g., at the edge, which the timing source synchronizing component 124 can detect and use to determine to record the corresponding QPC). Moreover, in an example, the API can allow the application 110 to get the predicted accuracy of the QPC value, as described.

In a specific example, device 100 can include a head-mounted display (HMD) device for providing a virtual reality, mixed reality, or similar experience. The HMD device can include various inertial sensors, cameras, etc. as input devices 112, 114 for detecting a head position of the HMD device, which can be used in rendering scenes to a display on the HMD device. In an example, the inertial sensors, cameras, etc. can be connected to the HMD device (e.g., processor 102 of the HMD device) via a USB bus. In this example, an application 110 executing to provide the virtual reality/mixed reality experience can obtain data from the various input devices 112, 114, which may indicate a movement of the HMD device, an acceleration or speed related to the movement, images captured from the HMD device, etc. In an example, strong timing correlation among the data from the various sensors and the application 110 may be desirable (e.g., to match inertial measurements with corresponding captured images, etc.). The interface controller 116 can receive the data from the various input devices 112, 114 with timestamps (e.g., based on clocks in the input devices 112, 114, the interface clock 122, such as a USB clock, etc.) and/or may perform the timestamping as the input data is received.

In this example, the application 110 can resolve the timestamps from the interface clock 122 to corresponding time values of the host clock 120. In one example, the application 110 can request and/or periodically receive, from the timing source synchronizing component 124, the interface clock 122 value (e.g., frame and/or microframes) and the host clock 120 value (e.g., QPC value) at the same or similar instant in time. Timing source synchronizing component 124 can compute (e.g., on request) or otherwise maintain (e.g., and report on request) the clock drift between the values of the clocks 120, 122. In this example, application 110 can resolve the timestamps by applying the currently maintained clock drift thereto. In another example, application 110 can request, from the timing source synchronizing component 124, the host clock 120 value corresponding to a previous interface clock 122 value, which application 110 can indicate in the request, and timing source synchronizing component 124 can predict the previous time, as described above, and/or may return a computed accuracy for the predicted time. In yet another example, application 110 can request and/or periodically receive, from the timing source synchronizing component 124, the determined clock drift amount, which the application 110 can apply to received interface clock 122 values to resolve the corresponding host clock 120 value. In any case, application 110 can determine the host clock 120 value corresponding to input data received from input devices 112, 114 for synchronizing the received data with other received or generated data (e.g., synchronizing motion data of the HMD device with an image or scene rendered by the application 110), synchronizing the received data with operations of the application 110, and/or the like.

FIG. 3 illustrates an example of a message flow diagram 300 for indicating synchronization information for multiple timing sources in accordance with examples described herein. Message flow diagram 300 shows an application 110 that can communicate with an interface controller driver 118 to obtain synchronization information for multiple clocks, and an interface controller 116 that can maintain a clock for an interface (e.g., a USB interface). In one example, application 110 can optionally send an API registration to the interface controller driver 118 at 302, which can allow the application 110 to request use of the interface controller driver 118 to communicate with the interface controller 116, and/or more specifically, to receive timing synchronization information from the interface controller driver 118. In response or otherwise, interface controller driver 118 can optionally send a request synchronization start command to the interface controller 116 at 302, which can cause the interface controller 116 to provide or call interrupts on the interface controller driver 118 to notify the interface controller driver 118 of one or more timing-related events. Starting the interrupts when the API registration is sent at 302 can allow for minimizing interruptions to the device where the synchronization functionality is not needed. For example, interface controller 116 can call a callback function on the interface controller driver 118, or otherwise notify the interface controller driver 118 of the timing-related event, which may include interface controller 116 notifying the interface controller driver 118 when a new frame starts, when a new microframe starts, and/or the like.

For example, interface controller 116 can maintain a clock (e.g., interface clock 122) that can track frames and/or microframes over the interface for communicating with one or more input devices. Where the interface controller 116 is a USB controller, as described above, the frames can occur every 1 ms and the microframes can occur every 125 us within each 1 ms frame. In any case, interface controller 116 can notify the interface controller driver 118 of each frame by sending a frame start notification to the interface controller driver 118 at 306. Interface controller driver 118 can store the frame, microframe, and/or a QPC (e.g., in a memory, such as memory 104) based on receiving the frame start at 308. For example, interface controller driver 118 can obtain the QPC based on receiving the frame start, where the QPC can be based on a host clock of a processor of the device (e.g., host clock 120 of processor 102, etc.). In another example, interface controller 116 can optionally also notify the interface controller driver 118 of each microframe start at 310, and/or the interface controller driver 118 can similarly store the frame, microframe, and/or QPC at 312. In yet another example, interface controller 116 can notify the interface controller driver 118 each time the interface clock overflows, as described.

In this example, application 110 may optionally request timing information from the interface controller driver at 314 (e.g., via an API call), and the interface controller driver 118 can provide corresponding timing information to the application at 316. As described, for example, the timing information 316 can include the more recently stored QPC, frame, and/or microframe to allow the application 110 to match a current frame and microframe to a current QPC for synchronizing data from an input device received via the interface controller driver 118 with other input device data and/or data generated by the application 110. In another example, the timing information received at 316 can include a timing difference determined between the QPC and frame/microframe, a computed drift of one or more of the host clock 120 or interface clock 122 based on two or more previous QPC values and associated frame/microframe, as described above. In yet another example, the application 110 can include a previous frame/microframe in the request at 314 and can receive an associated QPC in timing information at 316, and/or vice versa, as described.

Moreover, for example, based on the timing request at 314 or otherwise, interface controller driver 118 can optionally notify the application 110 of timing information based on certain events. For example, interface controller driver 118 can notify the application 110 of updated timing information, at each frame start 318, at 320. In another example, interface controller driver 118 can additionally or alternatively notify the application 110 of updated timing information, at one or more microframe starts 322, at 324. In yet another example, interface controller driver 118 can notify the application 110 of updated timing information when the interface clock overflows. In any case, application 110 can optionally deregister the API at 326 (e.g., upon termination of the application 110 or otherwise determining that timing synchronization is no longer needed, and the interface controller driver 118 can optionally request, from the interface controller 116, termination of receiving the synchronization interrupts at 328.

Figure 4:
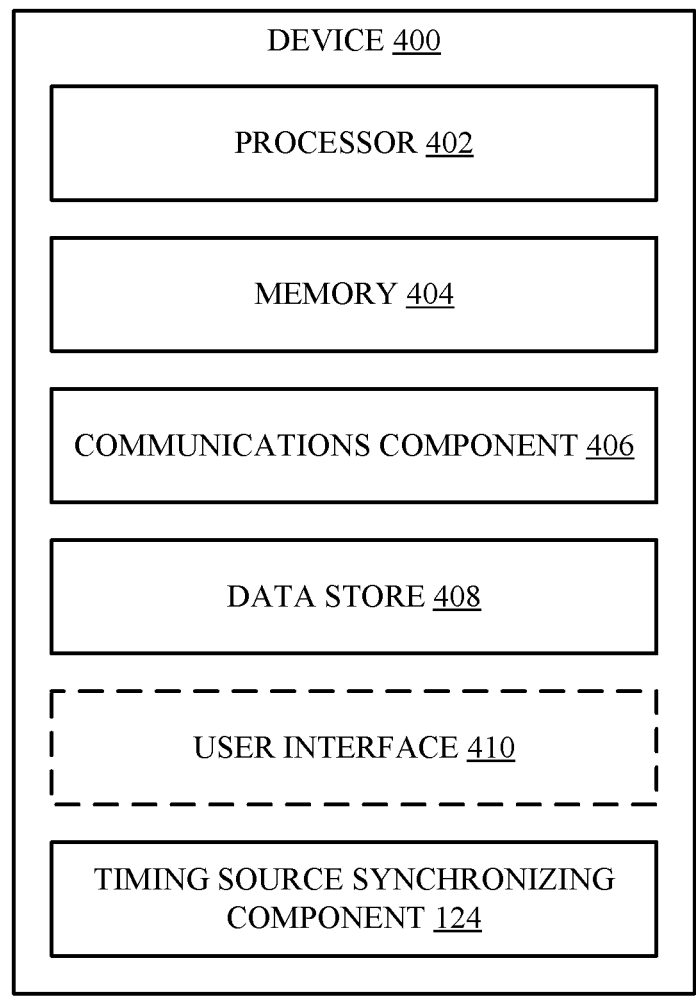
FIG. 4 is a schematic diagram of an example of a device for performing functions described herein.

FIG. 4 illustrates an example of device 400, similar to or the same as device 100 (FIG. 1), including additional optional component details as those shown in FIG. 1. In one implementation, device 400 may include processor 402, which may be similar to processor 102 for carrying out processing functions associated with one or more of components and functions described herein. Processor 402 can include a single or multiple set of processors or multi-core processors. Moreover, processor 402 can be implemented as an integrated processing system and/or a distributed processing system.

Device 400 may further include memory 404, which may be similar to memory 104 such as for storing local versions of applications being executed by processor 402, such as timing source synchronizing component 124, applications, related instructions, parameters, etc. Memory 404 can include a type of memory usable by a computer, such as random access memory (RAM), read only memory (ROM), tapes, magnetic discs, optical discs, volatile memory, non-volatile memory, and any combination thereof.

Further, device 400 may include a communications component 406 that provides for establishing and maintaining communications with one or more other devices, parties, entities, etc., utilizing hardware, software, and services as described herein. Communications component 406 may carry communications between components on device 400, as well as between device 400 and external devices, such as devices located across a communications network and/or devices serially or locally connected to device 400. For example, communications component 406 may include one or more buses, and may further include transmit chain components and receive chain components associated with a wireless or wired transmitter and receiver, respectively, operable for interfacing with external devices.

Additionally, device 400 may include a data store 408, which can be any suitable combination of hardware and/or software, that provides for mass storage of information, databases, and programs employed in connection with implementations described herein. For example, data store 408 may be or may include a data repository for applications and/or related parameters (e.g., timing source synchronizing component 124, applications, etc.) not currently being executed by processor 402. In addition, data store 408 may be a data repository for timing source synchronizing component 124, applications, and/or one or more other components of the device 400.

Device 400 may optionally include a user interface component 410 operable to receive inputs from a user of device 400 and further operable to generate outputs for presentation to the user. User interface component 410 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 410 may include one or more output devices, including but not limited to a display, a speaker, a haptic feedback mechanism, a printer, any other mechanism capable of presenting an output to a user, or any combination thereof.

Device 400 may additionally include timing source synchronizing component 124 for synchronizing timing among multiple timing sources related to the device 400, such to facilitate association of time-occurring events in the same or similar time domain.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more implementations, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various implementations described herein. Various modifications to these implementations will be readily apparent to those skilled in the art, and the generic principles defined herein may be applied to other implementations. Thus, the claims are not intended to be limited to the implementations shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various implementations described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for synchronizing multiple timing sources in a computing device, comprising:
   maintaining, by the computing device, at least a first clock associated with a first timing source and a second clock associated with a second timing source;
   receiving, from an application, a request for an indication of a difference in values between the first clock and the second clock;
   determining, by the computing device and at an instance of a reoccurring event in a domain of one of the first timing source or the second timing source, a first elapsed time of the first clock and a second elapsed time of the second clock from a previous instance of the reoccurring event, wherein the reoccurring event relates to a register overflow of a value of the first clock or the second clock; and
   providing, to the application and in response to the request, the indication related to the first elapsed time and the second elapsed time.

2. The method of claim 1, wherein the indication includes a clock drift computed based on a difference between the first elapsed time and the second elapsed time.

3. The method of claim 2, further comprising predicting, in the domain of the one of the first timing source or the second timing source and based on the clock drift, a time at which past events occur in a second domain of the other one of the first timing source or the second timing source.

4. The method of claim 3, further comprising determining an accuracy of the predicted time.

5. The method of claim 1, wherein the previous instance of the event corresponds to initialization of at least one of the first timing source or the second timing source.

6. The method of claim 1, wherein the reoccurring event corresponds to an interrupt indicating the register overflow of the value of the first clock or the second clock.

7. The method of claim 1, wherein providing the indication to the application is based at least in part on at least one of a detected power utilization or a temperature associated with the computing device.

8. The method of claim 1, wherein the first timing source is associated with a central processing unit (CPU) of the computing device, and the second timing source is associated with an interface controller of the computing device.

9. The method of claim 1, wherein the first timing source and the second timing source operate at different granularities of timing.

10. A device for synchronizing multiple timing sources, comprising:
    a memory storing one or more parameters or instructions for maintaining the multiple timing sources; and
    at least one processor coupled to the memory, wherein the at least one processor is configured to:
       maintain at least a first clock associated with a first timing source and a second clock associated with a second timing source;
       receive, from an application, a request for an indication of a difference in values between the first clock and the second clock;
       determine, at an instance of a reoccurring event in a domain of one of the first timing source or the second timing source, a first elapsed time of the first clock and a second elapsed time of the second clock from a previous instance of an event, wherein the reoccurring event relates to a register overflow of a value of the first clock or the second clock; and
       provide, to the application and in response to the request, the indication related to the first elapsed time and the second elapsed time.

11. The device of claim 10, wherein the indication includes a clock drift computed based on a difference between the first elapsed time and the second elapsed time.

12. The device of claim 11, wherein the at least one processor is further configured to predict, in the domain of the one of the first timing source or the second timing source and based on the clock drift, a time at which past events occur in a second domain of the other one of the first timing source or the second timing source.

13. The device of claim 10, wherein the previous instance of the event corresponds to initialization of at least one of the first timing source or the second timing source.

14. The device of claim 10, wherein the previous instance of the event is the previous instance of the reoccurring event.

15. The device of claim 10, wherein the reoccurring event corresponds to an interrupt indicating the register overflow of the value of the first clock or the second clock.

16. The device of claim 10, wherein the at least one processor is configured to provide the indication to the application based at least in part on at least one of a detected power utilization or a temperature associated with the device.

17. The device of claim 10, wherein the first timing source is associated with a central processing unit (CPU) of the device, and the second timing source is associated with an interface controller of the device.

18. A non-transitory computer-readable medium, comprising code executable by one or more processors for synchronizing multiple timing sources in a computing device, the code comprising code for:

maintaining, by the computing device, at least a first clock associated with a first timing source and a second clock associated with a second timing source;

receiving, from an application, a request for an indication of a difference in values between the first clock and the second clock;

determining, by the computing device and at an instance of a reoccurring event in a domain of one of the first timing source or the second timing source, a first elapsed time of the first clock and a second elapsed time of the second clock from a previous instance of an event, wherein the reoccurring event relates to a register overflow of a value of the first clock or the second clock; and providing, to the application and in response to the request, the indication related to the first elapsed time and the second elapsed time.

19. The non-transitory computer-readable medium of claim 18, wherein the indication includes a clock drift computed based on a difference between the first elapsed time and the second elapsed time.

* * * * *